(12) United States Patent
Wilkins et al.

(10) Patent No.: US 8,989,256 B2
(45) Date of Patent: Mar. 24, 2015

(54) METHOD AND APPARATUS FOR USING SEGMENTATION-BASED CODING OF PREDICTION INFORMATION

(75) Inventors: Paul Wilkins, Cambridge (GB); Yaowu Xu, San Diego, CA (US); James Bankoski, Wynantskill, NY (US)

(73) Assignee: Google Inc., Mountain View, CA (US)

( * ) Notice: Subject to any disclaimer, the term of this patent is extended or adjusted under 35 U.S.C. 154(b) by 505 days.

(21) Appl. No.: 13/115,638

(22) Filed: May 25, 2011

(65) Prior Publication Data

US 2012/0300837 A1 Nov. 29, 2012

(51) Int. Cl.
*H04N 19/00* (2014.01)
*H04N 19/167* (2014.01)
*H04N 19/513* (2014.01)
*H04N 19/196* (2014.01)
*H04N 19/103* (2014.01)
*H04N 19/17* (2014.01)

(52) U.S. Cl.
CPC ........... *H04N 19/167* (2014.01); *H04N 19/513* (2014.01); *H04N 19/196* (2014.01); *H04N 19/103* (2014.01); *H04N 19/17* (2014.01)
USPC .......................................... 375/240; 357/240

(58) Field of Classification Search
None
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |
| 5,398,068 A | 3/1995 | Liu et al. | |
| 5,469,273 A | 11/1995 | Demura | |
| 5,510,842 A | 4/1996 | Phillips et al. | |
| 5,512,952 A | 4/1996 | Iwamura | |
| 5,532,744 A | 7/1996 | Akiwumi-Assani et al. | |
| 5,617,541 A | 4/1997 | Albanese et al. | |
| 5,731,840 A | 3/1998 | Kikuchi et al. | |
| 5,761,423 A | 6/1998 | Lee | |
| 5,818,967 A | 10/1998 | Bhattacharjee et al. | |
| 5,886,652 A | 3/1999 | Adachi et al. | |
| 5,886,742 A | 3/1999 | Hibi et al. | |
| 5,991,428 A | 11/1999 | Taniguchi | |

(Continued)

FOREIGN PATENT DOCUMENTS

EP 0634873 9/1998
WO WO02/093488 11/2002

(Continued)

OTHER PUBLICATIONS

Cicconi et al., "Efficient Region-Based Motion Estimation and Symmetry Oriented Segmentation for Image Sequence Coding," IEEE Trans. on Circuits and Systems for Video Technology, vol. 4, No. 3, Jun. 1994, pp. 357-364.*

(Continued)

*Primary Examiner* — Jay Patel
*Assistant Examiner* — Reza Aghevli
(74) *Attorney, Agent, or Firm* — Young Basile Hanlon & MacFrarlane P.C.

(57) ABSTRACT

A method for encoding a video signal having at least one frame with a plurality of blocks includes assigning at least some of the plurality of blocks to a segment, determining at least one prediction element for the segment using a processor, applying the at least one prediction element to a first block and at least some of the other blocks in the segment and encoding the first block and the other blocks in the segment.

13 Claims, 7 Drawing Sheets

(56) References Cited

U.S. PATENT DOCUMENTS

| | | |
|---|---|---|
| 5,991,447 A | 11/1999 | Eifrig et al. |
| 6,005,980 A | 12/1999 | Eifrig et al. |
| 6,104,751 A | 8/2000 | Artieri |
| 6,108,383 A | 8/2000 | Miller et al. |
| 6,157,326 A | 12/2000 | Van Der Vleuten et al. |
| 6,173,012 B1* | 1/2001 | Katta et al. ............... 375/240.15 |
| 6,212,235 B1* | 4/2001 | Nieweglowski et al. 375/240.08 |
| 6,256,423 B1 | 7/2001 | Krishnamurthy et al. |
| 6,272,179 B1 | 8/2001 | Kadono |
| 6,289,049 B1 | 9/2001 | Kim et al. |
| 6,359,929 B1 | 3/2002 | Boon |
| 6,381,277 B1 | 4/2002 | Chun et al. |
| 6,434,197 B1 | 8/2002 | Wang et al. |
| 6,473,460 B1 | 10/2002 | Topper |
| 6,542,541 B1 | 4/2003 | Luna et al. |
| 6,574,273 B1 | 6/2003 | Luna et al. |
| 6,600,786 B1 | 7/2003 | Prakash et al. |
| 6,654,418 B2 | 11/2003 | Haskell et al. |
| 6,687,303 B1 | 2/2004 | Ishihara |
| 6,711,209 B1* | 3/2004 | Lainema et al. ............... 375/240 |
| 6,735,249 B1* | 5/2004 | Karczewicz et al. ......... 375/240 |
| 6,775,326 B2* | 8/2004 | Sekiguchi et al. ....... 375/240.14 |
| 6,778,553 B1 | 8/2004 | Chou |
| 6,907,079 B2 | 6/2005 | Gomila et al. |
| 6,917,651 B1 | 7/2005 | Yoo et al. |
| 7,088,773 B2 | 8/2006 | Paniconi et al. |
| 7,116,830 B2 | 10/2006 | Srinivasan |
| 7,173,968 B1* | 2/2007 | Kutka et al. .................... 375/240 |
| 7,184,482 B2 | 2/2007 | Prakash et al. |
| 7,218,674 B2 | 5/2007 | Kuo |
| 7,253,831 B2 | 8/2007 | Gu |
| 7,263,125 B2 | 8/2007 | Lainema |
| 7,672,377 B2* | 3/2010 | Heng et al. ............... 375/240.16 |
| 7,711,052 B2* | 5/2010 | Hannuksela et al. .... 375/240.27 |
| 7,715,475 B1 | 5/2010 | Puri et al. |
| 7,773,670 B1 | 8/2010 | Puri et al. |
| 8,503,528 B2 | 8/2013 | Grange et al. |
| 2002/0009153 A1 | 1/2002 | Jeon et al. |
| 2002/0031272 A1 | 3/2002 | Bagni et al. |
| 2002/0071485 A1 | 6/2002 | Caglar et al. |
| 2002/0176502 A1 | 11/2002 | Rose et al. |
| 2002/0181790 A1 | 12/2002 | Nakata |
| 2003/0035484 A1 | 2/2003 | Prakash et al. |
| 2003/0138045 A1 | 7/2003 | Murdock et al. |
| 2003/0215018 A1 | 11/2003 | MacInnis et al. |
| 2004/0156437 A1* | 8/2004 | Lainema .................. 375/240.24 |
| 2004/0234144 A1 | 11/2004 | Sugimoto et al. |
| 2005/0180500 A1 | 8/2005 | Chiang et al. |
| 2006/0072664 A1 | 4/2006 | Kwon et al. |
| 2006/0093038 A1 | 5/2006 | Boyce |
| 2006/0098738 A1 | 5/2006 | Cosman et al. |
| 2006/0153304 A1 | 7/2006 | Prakash et al. |
| 2006/0251330 A1 | 11/2006 | Toth et al. |
| 2006/0285589 A1 | 12/2006 | Hannuksela |
| 2007/0025441 A1 | 2/2007 | Ugur et al. |
| 2007/0177673 A1 | 8/2007 | Yang |
| 2007/0217508 A1 | 9/2007 | Shimada et al. |
| 2007/0274385 A1 | 11/2007 | He |
| 2007/0274388 A1 | 11/2007 | Lee et al. |
| 2008/0152007 A1* | 6/2008 | Sekiguchi et al. ....... 375/240.14 |
| 2008/0181299 A1 | 7/2008 | Tian et al. |
| 2008/0187053 A1 | 8/2008 | Zhao et al. |
| 2008/0310745 A1 | 12/2008 | Ye et al. |
| 2009/0196342 A1 | 8/2009 | Divorra Escoda et al. |
| 2010/0061444 A1 | 3/2010 | Wilkins et al. |
| 2010/0074332 A1 | 3/2010 | Karczewicz et al. |
| 2010/0086028 A1 | 4/2010 | Tanizawa et al. |
| 2010/0098169 A1 | 4/2010 | Budagavi |
| 2010/0118945 A1 | 5/2010 | Wada et al. |
| 2010/0128796 A1 | 5/2010 | Choudhury |
| 2010/0142761 A1 | 6/2010 | Venkatapuram et al. |
| 2010/0278234 A1* | 11/2010 | Jeong et al. ............... 375/240.12 |
| 2010/0329334 A1* | 12/2010 | Kim et al. ................. 375/240.12 |
| 2011/0007977 A1 | 1/2011 | Amonou et al. |
| 2011/0249743 A1 | 10/2011 | Zhao et al. |

FOREIGN PATENT DOCUMENTS

| | | |
|---|---|---|
| WO | WO2005/094083 | 10/2005 |
| WO | WO2010/149900 | 12/2010 |

OTHER PUBLICATIONS

Salembier et al., "Segmentation-Based Video Coding System Allowing the Manipulation of Objects," IEEE Trans. on Circuits and Systems for Video Technology, vol. 7, No. 1, Feb. 1997, pp. 60-74.*

International Search Report for PCT/US2012/036891, mailed Nov. 26, 2012.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Chung R H Y et al. "Efficient Block-Based Motion Segmentation Method using Motion Vector Consistency"; Proceedings of the Ninth Conference on Machine Vision Application: Tsukuba Science City, Japan; May 16-18, 2005.

Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.

Glaser-Garrett, Jason, "A novel macroblock-tree algorithm for high-performance optimization of dependent video coding in H.264/AVC", Department of Computer Science, Harvey Mudd College, Date Unknown, 12 pp.

Guillotel, Philippe, et al.; "Comparison of motion vector coding techniques", SPIE vol. 2308, 1994, 11 pp.

(56) References Cited

OTHER PUBLICATIONS

Han et al., "Jointly Optimized Spatial Prediction and Block Transform for Video and Image Coding," IEEE Transactions on Image Processing, vol. 21, No. 4 (Apr. 2012).

Han et al., "Toward Jointly Optimal Spatial Prediction and Adaptive Transform in Video/Image Coding," ICASSP 2010 (Dallas, TX, Mar. 14-19, 2010).

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Park, Jun Sung, et al., "Selective Intra Prediction Mode Decision for H.264/AVC Encoders", World Academy of Science, Engineering and Technology 13, (2006).

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

Wiegand, Thomas, et al.; "Long-Term Memory Motion-Compensated Prediction", Publication Unknown, Date Unknown, 15 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

\* cited by examiner

| MV=NEW B0 | MV=B0 B1 | MV=B0 B2 | MV=B0 B3 |
|---|---|---|---|
| MV=B0 B4 | MV=NEW B5 | MV=B5 B6 | MV=B0 B7 |
| MV=B0 B8 | MV=B5 B9 | MV=B5 B10 | MV=B0 B11 |
| MV=NEW B12 | MV=NEW B13 | MV=NEW B14 | MV=B0 B15 |

| 1 B0 | 1 B1 | 1 B2 | 1 B3 |
|---|---|---|---|
| 1 B4 | 2 B5 | 2 B6 | 1 B7 |
| 1 B8 | 2 B9 | 2 B10 | 1 B11 |
| B12 | B13 | B14 | 1 B15 |

METHOD AND APPARATUS FOR USING SEGMENTATION-BASED CODING OF PREDICTION INFORMATION

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, IS O/IEC 14496-10).

These compression schemes can use different techniques to achieve compression. For example, many of these schemes use prediction techniques that predict where information contained in a portion of a first frame or first region of a frame can be found in a second frame or second region of the frame. The difference between the prediction and the portion of data in the second frame or second frame region is calculated to form a residual. One type of prediction, known as intra prediction, can be based on previously coded image samples within the current frame. Another type of prediction known as inter prediction can be based on previously coded frames ("reference frames"). One inter prediction technique, for example, can utilize block-based motion estimation and compensation. Motion estimation can involve searching for a sample region in a reference frame that, for example, closely matches a current block in a current frame. The luma and chroma samples of the matching sample region are subtracted from the current block to produce an error residual that is encoded. A motion vector is also encoded that describes the position of the matching sample region relative to the position of the current block.

In some motion estimation search algorithms, there is a trade-off between the cost of coding prediction information needed to perform the prediction and the quality of the prediction (i.e. finding the matching region). In other words, finding the "best" prediction can come with the cost of an increased bitrate. Conversely, decreasing bitrate can result in not finding the most suitable prediction.

SUMMARY

Methods and apparatuses for encoding and decoding a video signal are disclosed herein.

In accordance with one aspect of the disclosed embodiments, a method for encoding a video signal having at least one frame with a plurality of blocks each having pixels includes assigning at least some of the plurality of blocks to a segment and determining at least one prediction element for the segment using a processor. The method also includes applying the at least one prediction element to a first block and at least some of the other blocks in the segment encoding the first block and the other blocks in the segment.

In accordance with another aspect of the disclosed embodiments, an apparatus for encoding a video signal having at least one frame with a plurality of blocks includes a memory and a processor configured to execute instructions stored in the memory to assign at least some of the plurality of blocks to a segment. The processor is also configured to execute instructions stored in the memory to determine at least one prediction element for the segment using a processor and apply at least one prediction element to a first block and at least some of the other blocks in the segment. Further, the process is configured to execute instructions stored in the memory to encode the first block and the other blocks in the segment In accordance with yet another aspect of the disclosed embodiments, a method for decoding a video signal having at least one frame with a plurality of blocks includes assigning at least some of the plurality of blocks to a segment and obtaining at least one prediction element for the segment using a processor. The method also includes applying the at least one prediction element to a first block and at least some of the other blocks in the segment and decoding the first block using the at least one prediction element.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
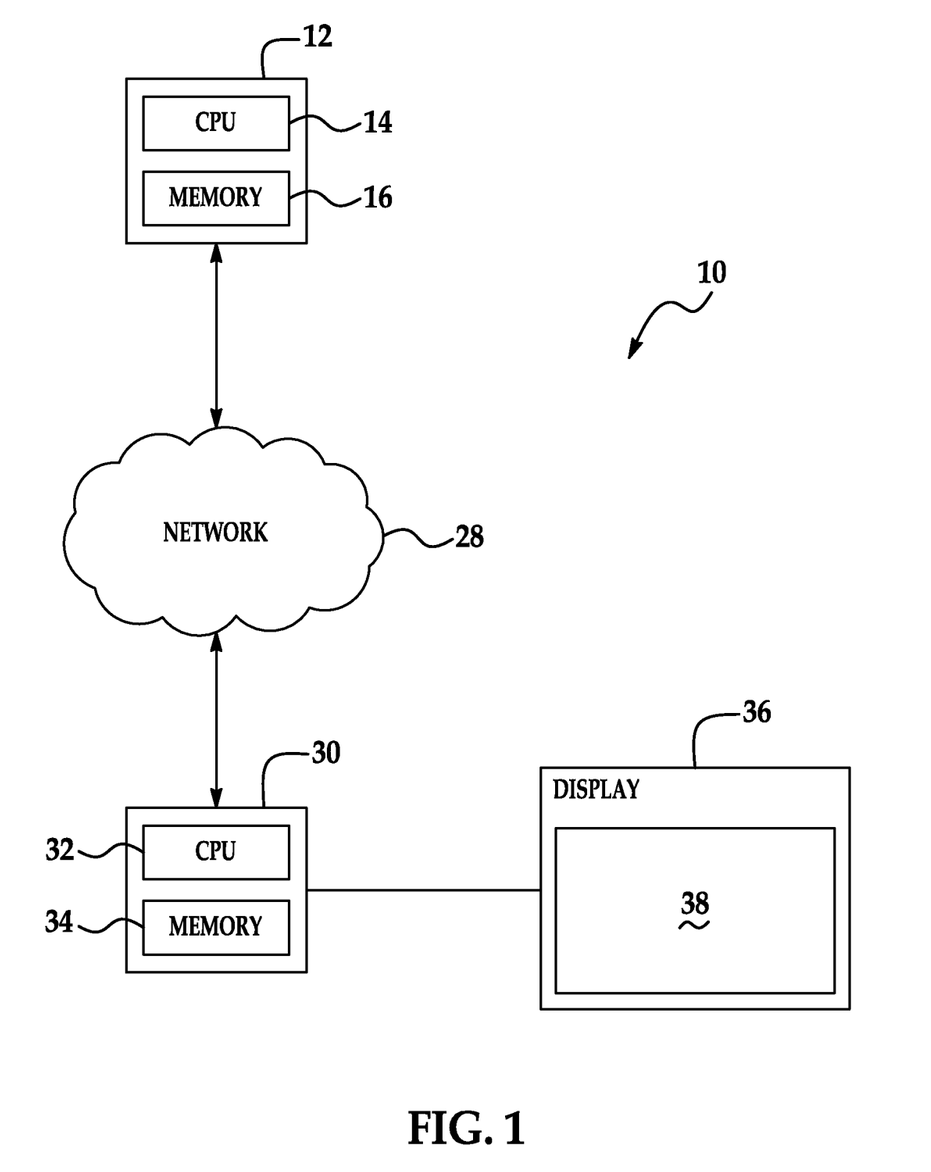
FIG. 1 is a diagram of an encoder and decoder system in accordance with one embodiment.

FIG. 1 is a diagram of an encoder and decoder system 10 for still or dynamic video images. An exemplary transmitting station 12 can be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 can be random access memory (RAM) or any other suitable memory device. Memory 16 can store data and program instructions which are used by the CPU 14. Other suitable implementations of transmitting station 12 are possible.

A network 28 connects transmitting station 12 and a receiving station 30 for encoding and decoding of the video stream. Specifically, the video stream can be encoded by an encoder in transmitting station 12 and the encoded video stream can be decoded by a decoder in receiving station 30. Network 28 can, for example, be the Internet. Network 28 can also be a local area network (LAN), wide area network (WAN), virtual private network (VPN), or any other means of transferring the video stream from transmitting station 12.

Receiving station 30, in one example, can be a computer having an internal configuration of hardware include a processor such as a central processing unit (CPU) 32 and a memory 34. CPU 32 is a controller for controlling the operations of receiving station 30. CPU 32 can be connected to memory 34 by, for example, a memory bus. Memory 34 can be RAM or any other suitable memory device. Memory 34 stores data and program instructions which are used by CPU 32. Other suitable implementations of receiving station 30 are possible.

A display 36 configured to display a video stream can be connected to receiving station 30. Display 36 can be implemented in various ways, including by a liquid crystal display (LCD) or a cathode-ray tube (CRT). The display 36 can be configured to display a video stream decoded by the decoder in receiving station 30.

Other implementations of the encoder and decoder system 10 are possible. For example, one implementation can omit the network 28 and/or the display 36. In another implementation, a video stream can be encoded and then stored for transmission at a later time by receiving station 12 or any other device having memory. In another implementation, additional components can be added to the encoder and decoder system 10. For example, a display or a video camera can be attached to transmitting station 12 to capture the video stream to be encoded.

Figure 2:
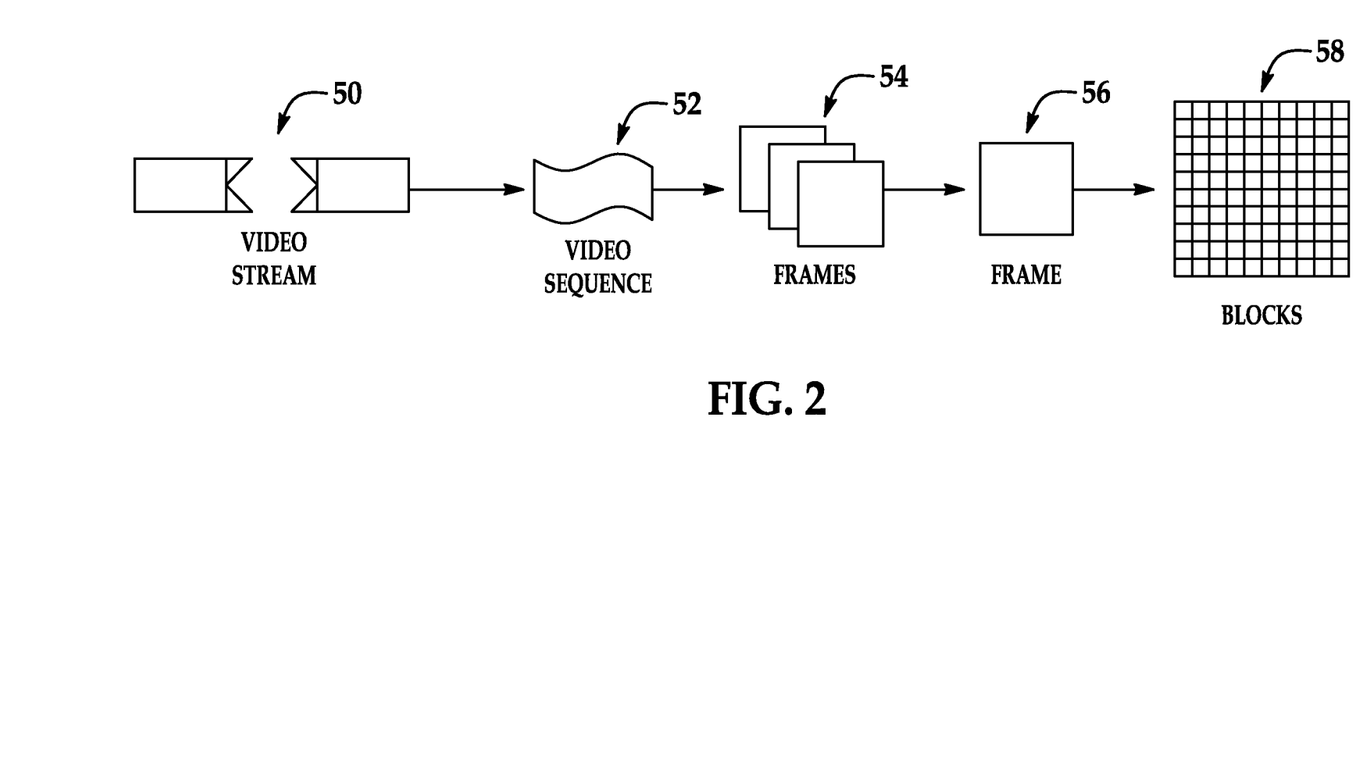
FIG. 2 is a diagram of a video bitstream that can be encoded and decoded by the system of FIG. 1.

FIG. 2 is a diagram a typical video stream 50 to be encoded and decoded. Video coding formats, such as VP8 or H.264, provide a defined hierarchy of layers for video stream 50. Video stream 50 includes a video sequence 52. At the next level, video sequence 52 consists of a number of adjacent frames 54, which can then be further subdivided into a single frame 56. At the next level, frame 56 can be divided into a series of blocks 58 (e.g. blocks), which can contain data corresponding to, for example, a 16×16 block of displayed pixels in frame 56. Each block can contain luminance and chrominance data for the corresponding pixels. Blocks 58 can also be of any other suitable size such as 16×8 pixel groups or 8×16 pixel groups.

Figure 3:
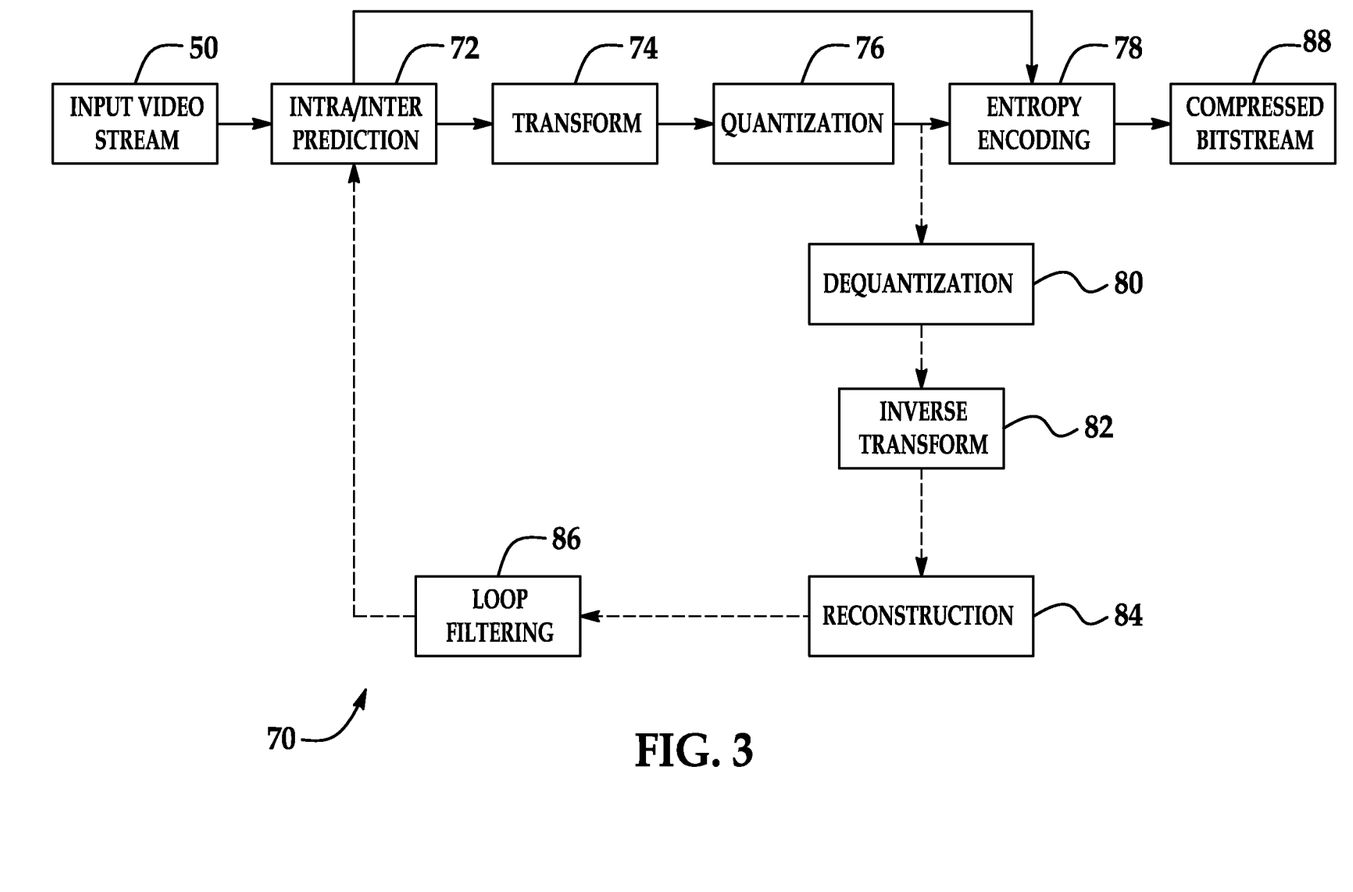
FIG. 3 is a block diagram of an exemplary encoder implemented in the system of FIG. 1.

FIG. 3 is a block diagram of an encoder 70 in accordance with one embodiment. In one embodiment, encoder 70 can be implemented, as described previously, in transmitting station 12. Encoder 70 encodes an input video stream 50. Encoder 70 has the following stages to perform the various functions in a forward path (shown by the solid connection lines) to produce an encoded or a compressed bitstream 88: an intra/inter prediction stage 72, a transform stage 74, a quantization stage 76 and an entropy encoding stage 78. Encoder 70 also includes a reconstruction path (shown by the dotted connection lines) to reconstruct a frame for encoding of further blocks. Encoder 70 has the following stages to perform the various functions in the reconstruction path: a dequantization stage 80, an inverse transform stage 82, a reconstruction stage 84 and a loop filtering stage 86. Other structural variations of encoder 70 can be used to encode input video stream 50.

When input video stream 50 is presented for encoding, each frame 56 within input video stream 50 is processed in units of blocks. At intra/inter prediction stage 72, each block can be encoded using either intra-frame prediction (i.e., within a single frame) or inter-frame prediction (i.e. from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at stage 72 to produce a residual block (residual). Transform stage 74 transforms the residual into transform coefficients in, for example, the frequency domain. Examples of block-based transforms include the Karhunen-Loève Transform (KLT), the Discrete Cosine Transform ("DCT") and the Singular Value Decomposition Transform ("SVD"). In one example, the DCT transforms the block into the frequency domain. In the case of DCT, the transform coefficient values are based on spatial frequency, with the lowest frequency (i.e. DC) coefficient at the top-left of the matrix and the highest frequency coefficient at the bottom-right of the matrix.

Quantization stage 76 converts the transform coefficients into discrete quantum values, which are referred to as quantized transform coefficients or quantization levels. The quantized transform coefficients are then entropy encoded by entropy encoding stage 78. The entropy-encoded coefficients, together with the information required to decode the block, such as the type of prediction used, motion vectors and quantizer value, are then output to compressed bitstream 88. The compressed bitstream 88 can be formatted using various techniques, such as run-length encoding (RLE) and zero-run coding.

The reconstruction path in FIG. 3 is present to ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at an inverse transform stage 82 in order to produce a derivative residual block (derivative residual). At reconstruction stage 84, the prediction block that was predicted at intra/inter prediction stage 72 can be added to the derivative residual to create a reconstructed block. A loop filter 86 can then be applied to the reconstructed block to reduce distortion such as blocking artifacts.

Other variations of encoder 70 can be used to encode compressed bitstream 88. For example, a non-transform based encoder can quantize the residual signal directly without transform stage 74. In another embodiment, an encoder can have quantization stage 76 and dequantization stage 80 combined into a single stage. The operation of encoding can be performed in many different ways and can produce a variety of encoded data formats. The above-described embodiments of encoding can illustrate some exemplary encoding techniques. However, in general, encoding is understood to mean any transformation of data from one form to another that may or may not include compression, reversibility or loss of data.

Figure 4:
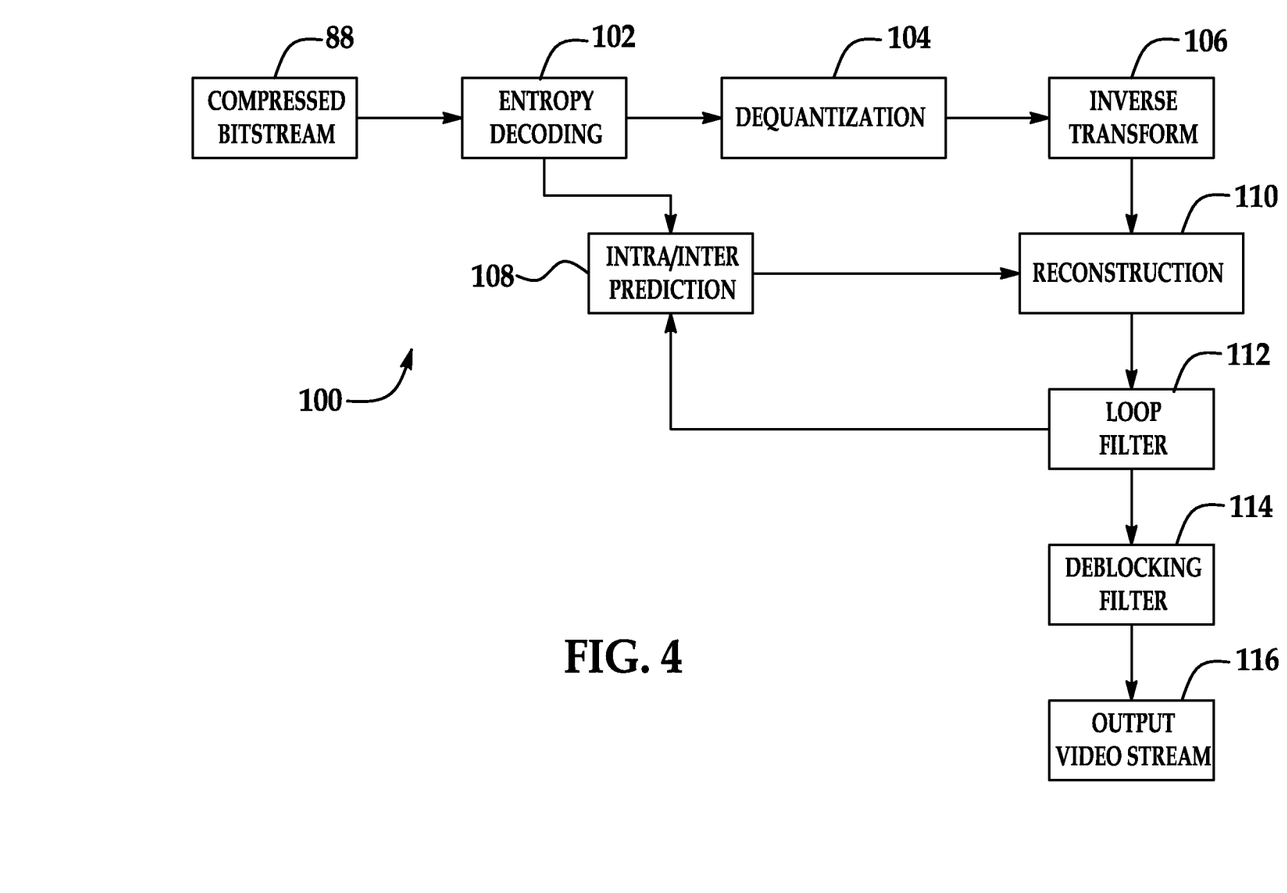
FIG. 4 is a block diagram of an exemplary decoder implemented in the system of FIG. 1.

FIG. 4 is a block diagram of a decoder 100 to decode compressed bitstream 88. Decoder 100 can be implemented, as described previously, in receiving station 30. Encoder 70 encodes an input video stream 50. Decoder 100, similar to the reconstruction path of the encoder 70 discussed previously, includes the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filter stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 (using, for example, Context Adaptive Binary Arithmetic Decoding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by the reconstruction stage in the encoder 70. Using header information decoded from the compressed bitstream 88, decoder 100 can use intra/inter prediction stage 108 to create the same prediction block as was created in encoder 70. At the reconstruction stage 110, the prediction block can be added to the derivative residual to create a reconstructed block. The loop filter 112 can be applied to the reconstructed block to reduce blocking artifacts. Deblocking filter 114 can be applied to the reconstructed block to reduce blocking distortion, and the result is output as output video stream 116.

Other variations of decoder 100 can be used to decode compressed bitstream 88. For example, a decoder can produce output video stream 116 without deblocking filtering stage 114.

Figure 5:
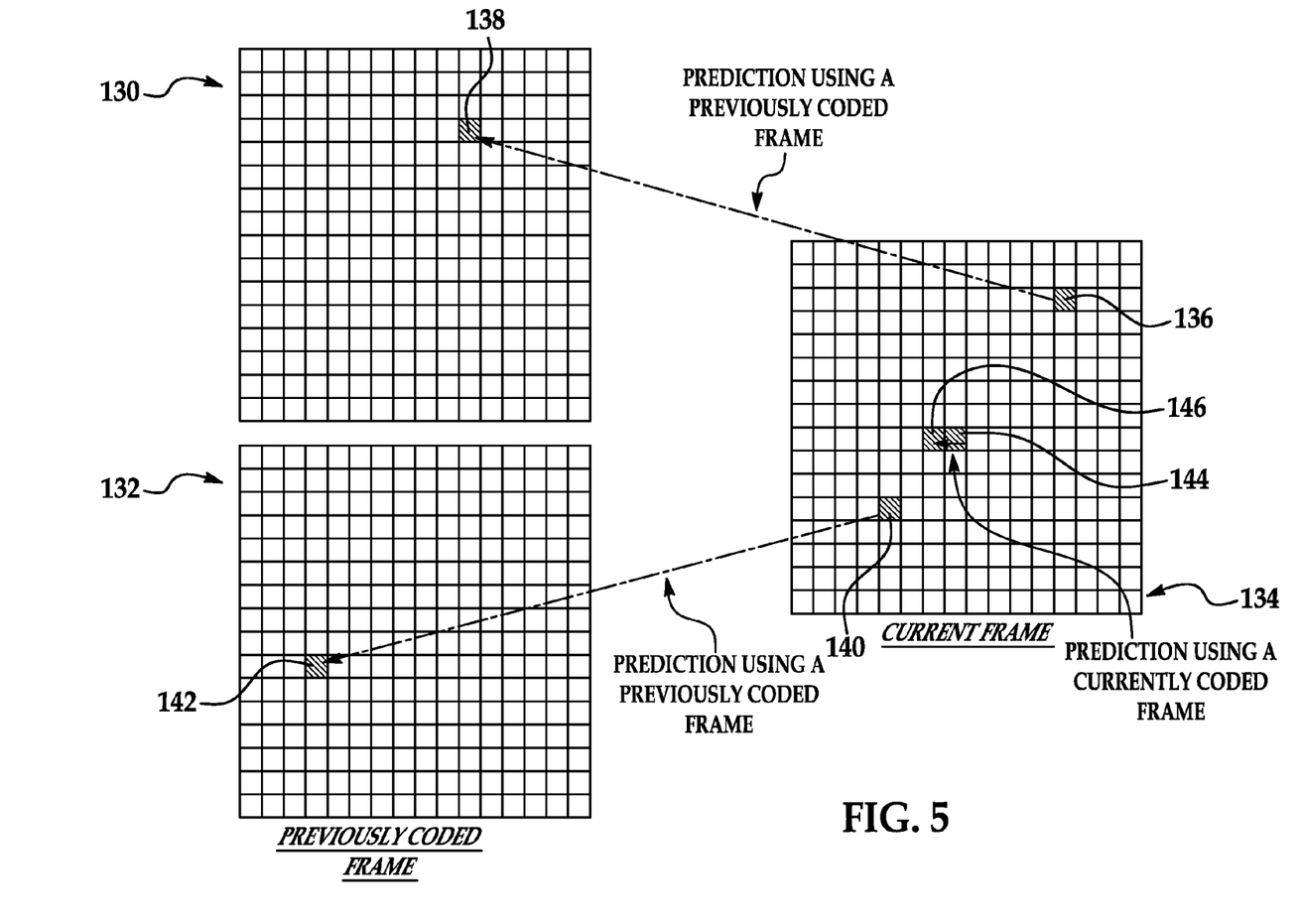
FIG. 5 is a schematic diagram of intra-prediction and inter-prediction modes used in the encoder and decoder of FIGS. 3 and 4.

FIG. 5 is a schematic diagram of intra prediction and inter prediction. As illustrated, FIG. 5 shows reference frames 130, 132 and a current frame 134 that is currently being encoded or decoded. As discussed previously, each frame can be processed in units of blocks at intra/inter prediction stage 72 or intra/inter prediction stage 108 and each block can be coded using either intra prediction, inter prediction or some combination of inter prediction and intra prediction. For example, a current block 136 is shown being encoded or decoded using inter prediction from a block 138 from previously coded reference frame 130. Similarly, a current block 140 is shown being encoded or decoded using inter prediction from a block 142 from previously encoded reference frame 132. Also, for example, a current block 144 is shown being encoded or decoded using intra prediction from a block 146 within current frame 134.

Inter prediction can utilize block-based motion estimation to compensate for movement of blocks each having, for example, M×N samples (e.g. 16×16) in the current frame. To predict the position of a current block (e.g. current block 140) in a current frame (e.g., frame 134), an area can be searched in a reference frame (e.g., previously coded frame 132) to find a best-matching block. The searched area or search window can be a region in the reference frame that is centered about the same coordinates as the current block in the current frame that is extended by a maximum displacement R. As such, the search window can have an area of (2R+M)×(2R+N). Other search areas/windows are possible. For example, the search window can be centered around the best-matching block found in a previous search.

Block-based motion estimation is the process of using a search scheme to find the best-matching block in the search window on the basis of a matching criterion. In some instances, the matching criterion is a measure of error between a block in the search window and the current block, and the best matching block is a block in the search window that has the lowest measure of error. For example, the measure of error can be the mean squared error, mean absolute difference or, normalized cross-correlation function between the current block and the search window block. Other matching criteria are also possible.

The displacement between the current block and the best-matching block is saved as a motion vector for the current block. Subsequently, the best-matching block (i.e. the predictor) is subtracted from the current block to form the residual block. As discussed previously, both the residual block and the motion vector can be further processed and compressed (e.g., through transformation, quantization, and entropy encoding).

Both accuracy (i.e. prediction quality) and bitrate are important characteristics of motion estimation and compensation. Spending more bits on the prediction signal by, for example, increasing the number or precision of motion vectors, can result in a reduction in the size (i.e. number of bits) of the residual block. Hence, in some motion estimation and compensation algorithms, there is a trade-off between the quality of the prediction and the bitrate. In other words, finding the "best" matching block can come with a cost of additional bits. Conversely, decreasing the number of bits used to represent the prediction signal can result in not finding the "best" matching block.

Figure 6:
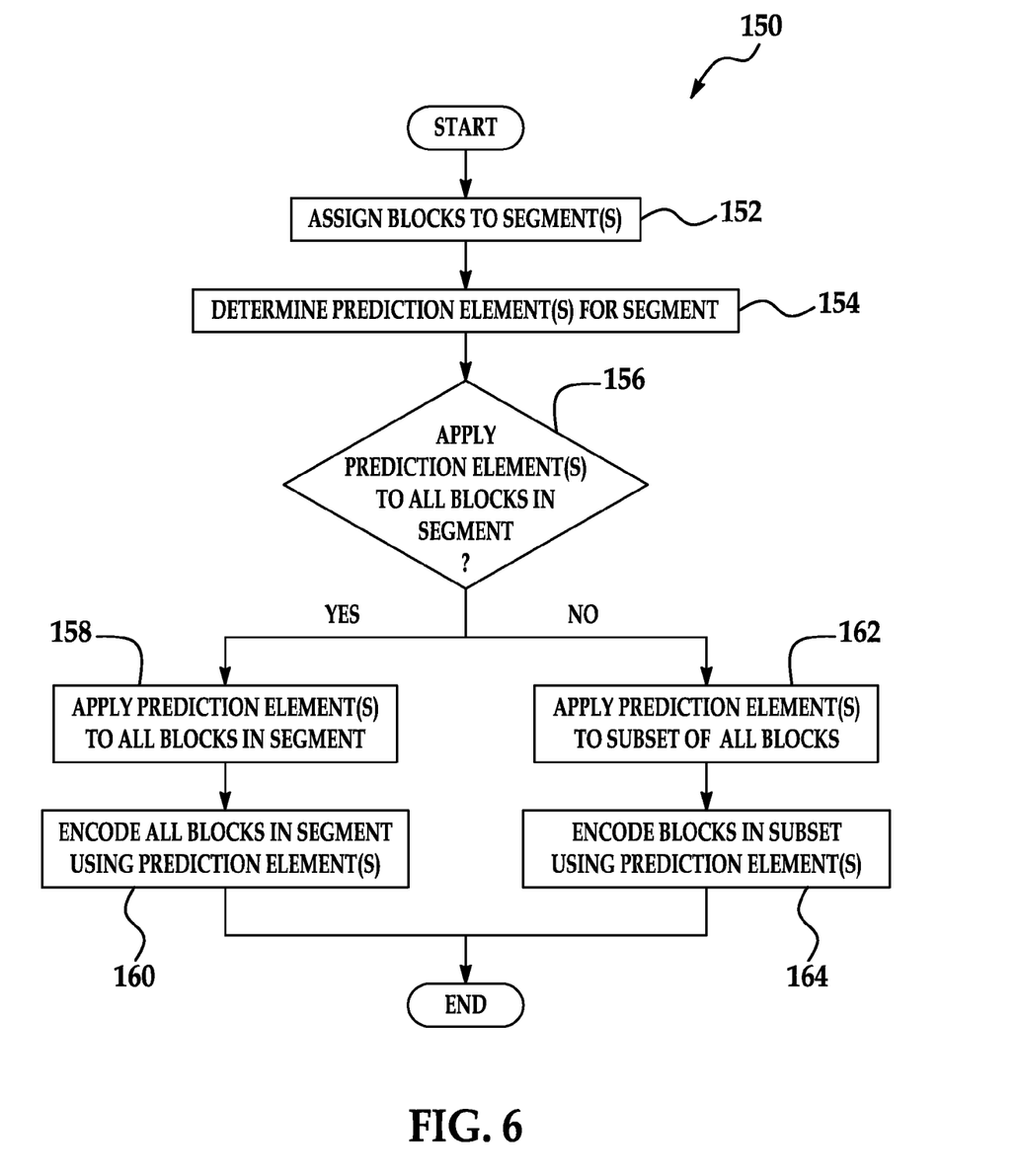
FIG. 6 is flow chart diagram of an exemplary process of prediction for use by the encoder and decoder of FIGS. 3 and 4.

FIG. 6 is an exemplary prediction process 150 for use by, for example, encoder 70 or decoder 100. Beginning at step 152, one or more blocks in a current frame (e.g. frame 134) are assigned to a segment. Blocks in the current frame can be assigned to the same segment based on one or more factors such as motion information, color information or spatial information Other parameters are also available. Further, frames can have more than one segment. The layout of the segments and the allocation of blocks to various segments, or the segmentation map, can vary, for example, from frame to frame throughout the encoding or decoding process. In other embodiments, the segmentation map can persist for each frame, be updated periodically, or be updated based on some other factor such as a rate-distortion metric.

The segmentation can be explicitly coded in the compressed bitstream 88 or the allocation of blocks can be detected by decoder 100 implicitly, based upon other information carried in compressed bitstream 88 or determined algorithmically through analysis of the content or encoding choices in one or more previously encoded frames, for example.

As one example, when motion information is the parameter used for determining the segmentation map, neighboring blocks having similar motion vectors are identified and are assigned to one or more segments. Through this process, all neighboring blocks having similar motion vectors are assigned to the same segment. Neighboring blocks can include adjacent blocks and/or non-adjacent blocks. For example, a neighboring block can be a block located within a predetermined number of blocks from a current block. The predetermined number of blocks can be any suitable number, such as within three blocks from another block.

Similar motion vectors also include motion vectors that are the same. In one implementation, the motion vectors for two neighboring blocks are considered to be similar when the distance between the motion vectors is less than some threshold distance. Other similarity measures are also possible. In some instances, blocks having unique motion vectors will be assigned to their own segment or may not be assigned to any segment.

Figure 7A:
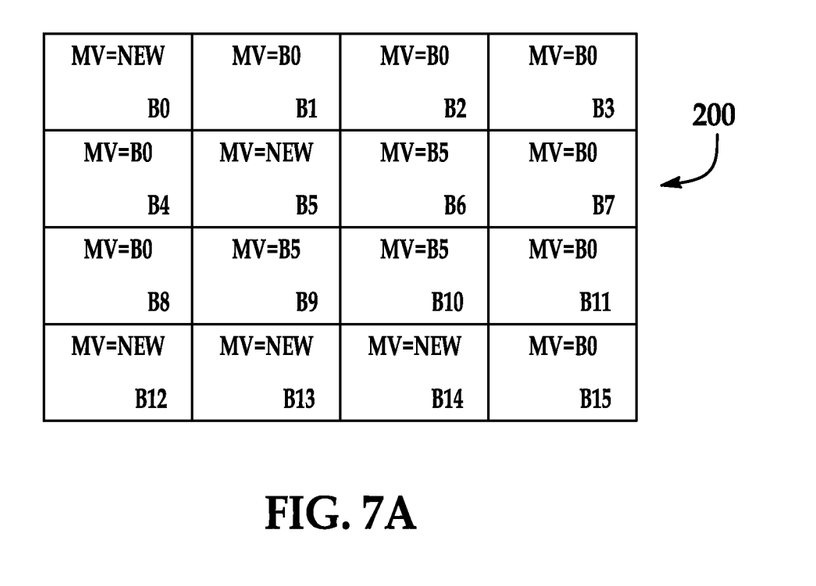
FIG. 7A is an exemplary schematic diagram of motion vector designations for blocks in a frame for processing by the motion estimation process of FIG. 5.

FIG. 7A is an exemplary schematic diagram showing the assignment of motion vectors for blocks B0-B15 in a frame 200. To ease the reader's understanding, frame 200 has been simplified to include only 16 blocks, though any number of blocks can be included. As illustrated, block B0 contains a new motion vector (MV). Blocks B1-B3, B4, B7, B8, B11 and B15 all have motion vectors that are the same or similar to the motion vector of block B0, and are therefore assigned the motion vector from block B0. Similarly, block B5 contains a new motion vector, and blocks B6, B9 and B10 have motion vectors that are the same or similar to the motion vector of block B0, and are therefore assigned the motion vector from block B5. Each of blocks B12, B13 and B14 all have new motion vectors that are not used by any other blocks.

Figure 7B:
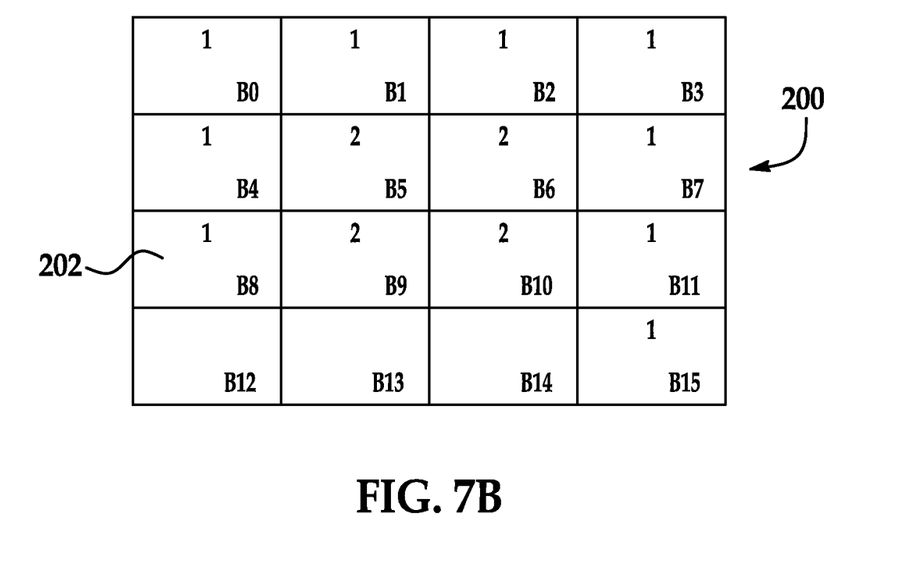
FIG. 7B is an exemplary schematic diagram of the blocks of FIG. 6 assigned to groups.

FIG. 7B is an exemplary schematic diagram showing the assignment of blocks B0-B15 of FIG. 7A to segments or a segmentation map 202. As illustrated, frame 200 includes 3 distinct segments. Blocks B0-B3, B4, B7, B8, B11 and B15, which share the motion vector for block B0, are assigned to segment 1. Blocks B5, B6, B9 and B10, which share the motion vector for block B5, are assigned to segment 2. Blocks B12, block B13 and block B14 are not assigned to any segment. Each of these blocks has a unique motion vector that is not shared by any other blocks in frame 200.

As another example, when color information is the parameter used for determining the segmentation map, neighboring blocks having similar color values can be identified and assigned to one or more segments. Similar to the example discussed previously with respect to motion information, all neighboring blocks having similar color values are assigned to the same segment. In one implementation, the color values for two neighboring blocks are considered to be similar when the difference between, for example, the Y, U and V components of the pixels is less than some threshold value. Threshold value(s) for each of the Y, U, and V components can be the same or different. Further, the difference can be determined based on the average value of the color components in each block. In other embodiments, less than all of the components can be considered (e.g. only the Y component). Alternatively other color representation schemes (e.g., RGB) can be used.

As another example, when spatial information is the parameter used for determining the segmentation map, neighboring blocks having a similar spatial location can be identified and assigned to one or more segments. As one example, segments based on blocks having a similar spatial location can be a foreground segment and a background segment.

Apart from or in addition to the location, spatial information can also include the texture characteristics of the blocks in the video stream. Blocks having similar texture characteristics (e.g. uniform or non-uniform texture) can be assigned to the same segment. Spatial information can also include other signal characteristics other than the location or texture information of a block.

Although, as discussed previously, there can be more than one segment in the current frame, the following description will explain process 150 with reference to only one segment. It is to be understood, however, that the steps of process 150 can equally apply to other segments (if any) in the current frame.

Once blocks have been assigned to a segment, control moves step 154 to determine one or more prediction elements for the segment. A prediction element can be any information associated with motion estimation, motion compensation or other techniques of creating a prediction for the current block (e.g., intra prediction). For example, the prediction element can be a prediction mode, a reference frame or a motion vector. Other prediction elements are possible. For example, in some implementations, prediction elements can include an indication of some type of transformation (e.g., global zoom, warp, rotation, brightness change) that should be associated and applied at the segment level.

In some instances, one segment can have a set of prediction elements and another segment can have another set of prediction elements. For example, returning to FIG. 7B, segment 1 can have reference frame and a motion vector for prediction elements and segment 2 can only have a prediction mode for a prediction element. The prediction elements associated with a certain segment (e.g. segment 1) do not necessarily have to persist from frame to frame. For example, in one frame, segment 1 can have reference frame and a motion vector for prediction elements and in the next frame, segment 1 can only have the reference frame as a prediction element.

Further, which prediction elements are associated with a particular segment can vary, for example, from frame to frame throughout the encoding or decoding process. In other embodiments, the prediction elements associated with a particular segment can persist for each frame, be updated periodically, or be updated based on some other factor such as a rate-distortion metric.

Each prediction element can also have one or more possible values. For example, the prediction mode can be, for example, intra prediction or inter prediction. Further, intra prediction mode can also contain an associated coding mode. Coding modes relay how intra predictions are formed for a given block. Thus, for example, intra predictions can be formulated by copying samples (or filtered samples) from adjacent, previously coded blocks to predict the values in the current block. For example, a chroma component can be intra predicted using one of four prediction modes such as vertical prediction, horizontal prediction, DC prediction or True Motion prediction. Similarly, a luma component can be predicted using vertical prediction, horizontal prediction, DC prediction or True Motion prediction. Other prediction modes are also available (e.g. southwest prediction, southeast prediction, vertical right diagonal prediction, vertical left diagonal prediction, horizontal down prediction, horizontal up prediction, etc.). Rather than copying pixel values, another intra prediction coding mode uses one or more parameterized equations. These parameterized equations can, for example, be an expression representing a curve that has a "best fit" to a defined set of previously coded pixel values.

The reference frame (in the case of inter prediction) can be, for example, last frame, golden frame, alternate frame or constructed frame. The motion vector (again, in the case of inter prediction) can be any two-dimensional vector.

The value of the prediction element can be selected for the segment in a variety of different ways. The prediction element can be based on prediction information for one or more blocks in a segment. Prediction information for a block can include, a prediction mode (e.g. inter prediction or intra prediction), a reference frame or a motion vector or any other information associated with motion estimation or motion compensation or any other prediction technique.

In one implementation, the prediction element can be selected based on the value of prediction information that is most common among the blocks in that segment. For example, returning to FIG. 7B, if blocks B0-B3, B4, B7, B8, B11 each have the last frame as their designated reference frame and block B15 has the golden frame as its designated reference frame, then the last frame can be selected as the value for the reference frame prediction element since it is the most common among the blocks in that segment.

In another implementation, the prediction element can be selected based on the value of a certain block's prediction information within that segment. For example, if the prediction element is reference frame and block B2 has the last frame as its reference frame, the last frame can be selected as the value of the reference frame prediction element. The selection of the block can be random, predefined in the encoder or based on some other factor.

In another implementation, the value of the prediction element can be selected based on the average value of one or more blocks' prediction information in the segment. For example, if the prediction element is motion vector and block B0 has a motion vector of (0, 0) and block B1 has a motion vector of (4, 4), an average value of the two motion vectors, (2, 2) can be selected as the value of the motion vector prediction element for the segment. The average can be taken from all of the blocks in the segment or a subset of all the blocks in the segment.

The value of the prediction element can be an initial value or an absolute value. In the case of an initial value, each individual block within the segment can be associated with a change value. The change value can be an incremental value, a decremental value or any other value that can be combined with the initial value to amount to an absolute value. For example, if the initial value of a motion vector associated at the segment level is (1, 0), an individual block can have an incremental value of (1, 1). Thus, the absolute value of the motion vector for the individual block will be (2, 1). In other implementations, the absolute value, rather than the initial value, is what is associated at the segment level.

Further, the values of the prediction element(s) associated with a particular segment can vary, for example, from frame to frame throughout the encoding or decoding process. In other embodiments, the values of prediction element(s) associated with a particular segment can persist for each frame, be updated periodically, or be updated based on some other factor such as a rate-distortion metric.

The foregoing implementations describing selection of values for the prediction element are merely examples. Other techniques of selecting values are also possible.

Once the one or more prediction elements are determined at step 154, control moves to decision step 156 to determine whether to apply the prediction element(s) to all blocks in the segment. If the prediction element(s) are to be applied to all blocks, control moves to step 158 to apply the prediction element(s) to all blocks in the segment and moves to step 160 to encode the blocks in the segment using the prediction element.

As one example, if the prediction element for a certain segment is reference frame with a value of "last", all blocks in that segment are processed and encoded with the last frame as the reference frame. In some instances, certain blocks can initially have a different value for a reference frame (i.e. golden) that can be superseded with the value of the "last" reference frame.

Otherwise, if the prediction element(s) are not to be applied to all blocks, control moves to step 162 to apply the prediction element(s) to a subset of all blocks in the segment. A subset can be any number of blocks less than the total number of blocks in the segment. Control then moves to step 164 to encode blocks in the subset using the prediction element(s).

In other words, blocks that are not included in the subset can be considered as having "opted-out" of the values specified for the prediction element(s). Accordingly, a block that has opted-out can have an individual value associated for the block. For example, referring to FIG. 7B, segment 1 can specify a reference frame prediction element to be the "last" frame and the motion vector to be (0,0), but a specific individual block, such as block B1 can specify that the golden frame as its reference frame and still use the (0,0) motion vector specified at the segment level. In other instances, block B1 can also have a different motion vector than (0, 0) in addition to using a different reference frame.

During encoding, either at step 160 or step 164, the prediction element(s) can be associated with header information for the segment. The header information can contain information particular to the segment, including a unique id identifying the segment, information about the duration (e.g. time or number of frames) the segment persists over multiple frames, and/or information how this segment relates to other segments. Other segment data can also be included in the header information for segment. This header information can be used by the decoder to properly identify, process and decode the segment.

Utilizing more bits to represent prediction information by, for example, increasing the number or precision of motion vectors, can result in reduction in size of the residual block and can contribute to enhanced quality. Conversely, utilizing less bits to represent prediction information, can increase the size of the residual block and can contribute to poorer quality. Consequently, there is a tradeoff between the creating the best overall visual quality and having a low bitrate. Associating prediction elements and their values at the segment level can achieve an improved bitrate because less prediction information (or in some cases, no prediction information) will be presented at the individual block level. Further, using segmentation maps to assign blocks related in some manner (e.g. similar motion information, color information etc.) in can assist in improving visual quality notwithstanding the reduced bitrate. That is, information that is needed for obtaining improved visual quality can be coded more efficiently using the embodiments described herein. The embodiments, as discussed previously, can provide a mechanism by which individual blocks that are spatially and temporally related, can share information (i.e. the prediction elements) in order to improve bitrate whilst preserving visual quality.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of transmitting station 12 and/or receiving station 30 (and the algorithms, methods, instructions etc. stored thereon and/or executed thereby) can be realized in hardware, software, or any combination thereof including, for example, IP cores, ASICS, programmable logic arrays, optical processors, molecular processors, quantum processors, programmable logic controllers, microcode, firmware, microcontrollers, servers, microprocessors, digital signal processors or any other suitable circuit or other information processing device now existing or hereafter developed. In the claims, the term "processor" should be understood as encompassing any the foregoing, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screen casting system. Alternatively, transmitting station 12 can be implemented on a server and receiving station 30 can be implemented on a device separate from the server, such as a handheld communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having at least one frame with a plurality of blocks, comprising:
    assigning at least some of the plurality of blocks to a segment;
    determining segment-level values for each of a first prediction element and a second prediction element for the segment using a processor, wherein the first prediction element and the second prediction element are different types of prediction element;
    determining, for at least some blocks in the segment, a block-level value for the first prediction element using the processor;
    determining, for at least some blocks in the segment, a block-level value for the second prediction element using the processor;
    for each block in the segment that is not associated with a block-level value for the first prediction element and is not associated with a block-level value for the second prediction element, applying the segment-level values for the first prediction element and the second prediction element to the respective block;
    for each block in the segment that is not associated with a block-level value for the first prediction element and is associated with a block-level value for the second prediction element, applying the segment-level value for the first prediction element and applying the block-level value for the second prediction element to the respective block;
    for each block in the segment that is associated with a block-level value for the first prediction element and is not associated with a block-level value for the second prediction element, applying the block-level value for the first prediction element and applying the segment level value for the second prediction element to the respective block;
    for each block in the segment that is associated with a block-level value for the first prediction element and is associated with a block-level value for the second prediction element, applying the block-level values for the first prediction element and the second prediction element to the respective block; and
    outputting a compressed bitstream based in part on the plurality of blocks from the segment.

2. The method of claim 1, wherein the first prediction element is a prediction mode, a reference frame or a motion vector.

3. The method of claim 1, wherein the first prediction element is at least one of a prediction mode, a reference frame or a motion vector and the second prediction element is at least one of a prediction mode, reference frame or a motion vector.

4. The method of claim 1, wherein the at least some of the blocks are assigned to the segment based on at least one of:
    blocks having a similar motion vector in the at least one frame;
    blocks having a similar color value in the at least one frame; or
    blocks in a similar spatial location in the at least one frame.

5. The method of claim 4, wherein spatial location includes blocks that are at least one of neighboring blocks or blocks with similar texture characteristics.

6. The method of claim 1, further comprising:
    identifying prediction information for a first block in the segment, wherein the first prediction element is based on the first block's prediction information.

7. The method of claim 6, wherein the prediction information includes at least one of a prediction mode, a reference frame or a motion vector.

8. The method of claim 1, further comprising:
    identifying prediction information for a first block and other blocks in the segment;
    assigning blocks having similar prediction information to groups; and
    determining which group has the greatest number blocks, wherein the first prediction element is based on the prediction information associated with the group having the greatest number of blocks.

9. The method of claim 1, further comprising:
    identifying prediction information for a first block and at least one other block in the segment, wherein first prediction element is based at least on the first and the at least one other block's prediction information.

10. The method of claim 9, wherein the prediction information of the first and the at least one other block each includes a motion vector, further comprising:
    determining an average of the first block and the at least one other blocks motion vectors; and
    selecting the average as the first prediction element for the segment.

11. The method of claim 1, further comprising:
    associating the first predication element and the second prediction element with header information for the segment.

12. The method of claim 1, wherein a value of the first prediction element is one of an initial value that is associated with a block-specific change value for each block from the plurality of blocks or a final value that is not associated with the block-specific change value.

13. The method of claim 12, wherein the first prediction element is the initial value and wherein applying the at least one prediction element comprises:
- identifying the block-specific change value for a first block from the plurality of blocks; and
- combining the initial value and the block-specific value to the first block; and
- applying the combination to the first block.

* * * * *